United States Patent [19]
Galtz

[11] Patent Number: 4,471,754
[45] Date of Patent: Sep. 18, 1984

[54] VEHICLE HEATER

[75] Inventor: Rüdiger Galtz, Munich, Fed. Rep. of Germany

[73] Assignee: Webasto-Werk W. Baier GmbH, Gauting, Fed. Rep. of Germany

[21] Appl. No.: 416,041

[22] Filed: Sep. 8, 1982

[30] Foreign Application Priority Data

Sep. 16, 1981 [DE] Fed. Rep. of Germany ....... 3136839

[51] Int. Cl.³ .............................................. F24H 3/06
[52] U.S. Cl. .......................... 126/110 B; 237/12.3 C; 165/15 S
[58] Field of Search ...................... 237/12.3 C, 55, 50; 165/154, 182, DIG. 2, DIG. 12, 142, 15 S; 126/110 B

[56] References Cited

U.S. PATENT DOCUMENTS 1,666,367 4/1928 Clausing ......................... 237/12.3 C
3,913,663 10/1975 Gates .................................... 165/154
4,216,756 8/1980 Friedl et al. ..................... 126/110 B

FOREIGN PATENT DOCUMENTS 975176 9/1961 Fed. Rep. of Germany ..... 237/12.3 C
1800561 12/1977 Fed. Rep. of Germany ..... 237/12.3 C
1010325 11/1965 United Kingdom ........... 237/12.3 C Primary Examiner—Albert J. Makay
Assistant Examiner—Henry Bennett
Attorney, Agent, or Firm—Sixbey, Friedman & Leedom

[57] ABSTRACT

Vehicle heater with a tubular combustion chamber and with a pot-shaped heat exchanger crimped over the combustion chamber leaving an annular space, said heat exchanger deflecting the combustion gases in an axial direction. In order to improve the efficiency of such a vehicle heater and to keep the manufacturing and material costs as low as possible, a coaxial, double-walled pot is provided in such a vehicle heater, leaving an annular space between it and the heat exchanger, said pot having an opening in its bottom area and being connected at that point to the annular space between the combustion chamber and the heat exchanger in such fashion that the combustion gases are guided in the chamber between its inside wall and its outside wall and are from there conducted away by an exhaust pipe.

9 Claims, 10 Drawing Figures

VEHICLE HEATER

BACKGROUND AND SUMMARY OF THE INVENTION

The invention relates to a vehicle heater with a tubular combustion chamber and a pot-shaped heat exchanger, said heat exchanger being crimped over the combustion chamber, leaving an annular space, and deflecting the combustion gases in an axial direction.

A heat exchanger of this type is known from German OS No. 2,718,215 (which corresponds to U.S. Pat. No. 4,216,759). The known heater is not completely satisfactory as regards its efficiency, i.e., as regards the utilization of the heat contained in the combustion gases, since it comprises relatively small exchange surfaces for transmitting the heat of the combustion gases to the heating medium. If these areas are enlarged, the size of the entire device is increased as well.

German Pat. No. 975,176 teaches a vehicle heater which belongs to a different species, since it does not comprise a heat exchange tube, which is crimped in the manner recited hereinabove over the combustion chamber. In this known heater, the gases flow out of the combustion chamber through oval openings in a double-walled cylinder whose two walls have heating air flowing over them. The heating air which flows along the inside wall of the double-walled cylinder is supplied to the passenger compartment, while the heating air flowing along the outside wall is used for defrosting the windshield. This known device admittedly has heating surfaces which are larger than those of the device known from German OS No. 2,718,215, but it is costly to manufacture, since the welds on the oval openings between the heating chamber and the double-walled cylinder lie on complex penetrating curves, so that the welding process is correspondingly complicated.

German AS No. 1,800,561 teaches a heat exchanger with a plurality of tubular heat-exchanger elements. A combustion chamber is located in the center, said chamber leading into a double-walled pot at the end located opposite the burner. A tubular insert is disposed between the inside wall of the double-walled pot and outside wall of the combustion chamber in such fashion that a heating medium can be guided along the inside wall of the double-walled pot and back again along the outside wall of the combustion chamber. This known heat exchanger arrangement is unrelated to that of the invention, since the combustion chamber does not comprise a heat exchanger tube crimped over it. In addition, this known device is not well suited for vehicle heaters, since the double-walled pot conducting the hot combustion gases is located on the outside of the device, so that the outside wall of the device becomes correspondingly hot. This would not be usable for vehicle heaters for safety reasons. Consequently, costly shielding would be required which would increase the structural dimensions accordingly.

British Pat. No. 1,010,325 teaches a vehicle heater with a tubular combustion chamber. The combustion gases are transferred from the tubular combustion chamber through lateral openings into a double-walled cylinder, over whose inner and outer jacket surfaces a heating medium flows. It is true that in this vehicle heater, as mentioned above, there is a flowing layer of fresh heating medium between the double-walled cylinder through which the combustion gases flow, and the outer housing wall. However, radiant heat, which emerges directly from the combustion chamber through the lateral outlet openings and strikes the outer wall of the double-walled cylinder, is transferred to the housing wall, resulting in undesirable heating of the outer housing wall in the vicinity of the through openings. Another disadvantage of this known vehicle heater is that the openings between the combustion chamber and the double-walled combustion gas cylinder are complex to manufacture.

In view of this state of the art, a primary object of the present invention is to provide a vehicle heater of the type recited hereinabove which is characterized by large heat exchange surfaces with the smallest possible overall size, that can be economically manufactured, and will not have its outer housing jacket heated undesirably during operation.

According to the invention, this object is achieved according to a preferred embodiment vehicle heater having a coaxial, double-walled pot surrounding the heat exchanger leaving an annular space therebetween, said pot further having an opening in its bottom area and being connected at that point to the annular space between the combustion chamber and the heat exchanger in such fashion that the combustion gases are conducted into the space between its inside wall and its outside wall, and are then carried off via an exhaust pipe.

The feature, according to the invention, whereby a double-walled pot is provided, makes it possible to increase the heat exchange surfaces without significantly increasing the overall dimensions. The fact that the heat exchange surfaces are introduced from the heat exchange tubes into the bottom area of the double-walled pot means that concentric welded seams can be provided, if desired, which can be produced with relatively simple machinery. The vehicle heater according to the invention is, therefore, easy and inexpensive to manufacture, and is characterized by a high degree of efficiency; i.e., by good utilization of the combustion gas heat.

Since it is readily possible to conduct fresh heating medium between the outside wall of the double-walled pot and the wall of the housing, the outer housing wall is, on the one hand, shielded effectively against radiant heat and, on the other hand, according to an advantageous embodiment of the invention, provides a simple opportunity for conducting the heating medium (air or water) between the outside wall of the double-walled pot and the housing wall, whereby the housing wall can be kept even cooler.

According to another advantageous embodiment of the invention, a taper in the housing wall, provided in heaters according to the state of the art, can be used to deflect the heating medium from the annular chamber into the space between the inside wall of the double-walled pot and the heat exchanger. For this purpose, a deflecting tube is used which projects coaxially into this space. This permits the heating medium to flow out of the annular space between the housing wall and the outside wall of the pot to the inside wall of the pot and from there to the heat exchanger, before it leaves the heater through the deflecting tube.

According to still a further advantageous embodiment of the invention, a combustion gas deflecting tube can serve to guide the combustion gas inside the pot, said tube ensuring that combustion gases, which enter the interior of the pot in its bottom area, are conducted first to the side located opposite the bottom and from there back again to the bottom area and to the exhaust pipe. Installation of baffles can produce a flow of combustion gas in the double-walled pot which is as uniform as possible.

According to yet another, especially advantageous embodiment, the exhaust pipe is disposed in the bottom area of the pot. In order to prevent the combustion gases entering the bottom area of the pot from finding their way directly into the exhaust pipe, a baffle is disposed about the exhaust pipe, said baffle forcing the combustion gas initially into the part of the pot opposite the bottom area, so that it can then flow from there along the inside of the baffle to the exhaust pipe.

Advantageously, the double-walled pot and the heat exchanger are made of welded sheet metal. The deflection tube can also be welded up from these sheets.

In large heaters, however, wherein the material costs are more important, an additional, especially advantageous, embodiment provides for the heat exchanger and the double-walled pot, including the exhaust pipe, being made from a single casting, preferably an aluminum casting. Lengthwise ribs, mutually staggered circumferentially, are disposed on the outside surface of the inside wall of the double-walled pot and on the outside surface of the heat exchanger. The deflecting tube, made of stainless sheet, is clamped between these ribs.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
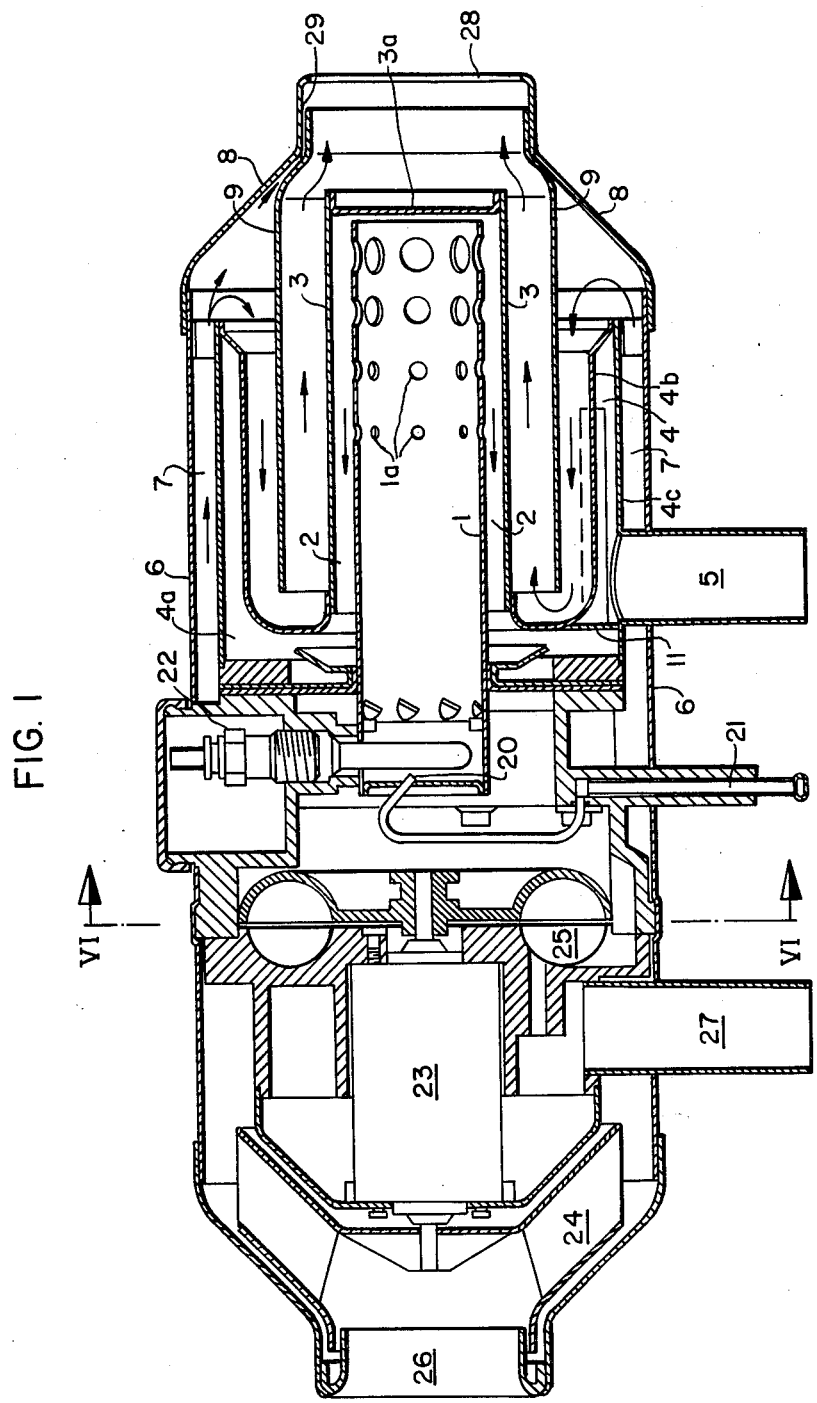
FIG. 1 is a lengthwise section through a vehicle heater according to the invention.

FIG. 1 shows a vehicle heater with air circulation in lengthwise section. The vehicle heater comprises a burner 20 with a fuel line 21. A spark plug 22 is located in front of the burner. An electric motor 23 drives a hot-air blower 24 and a combustion-air blower 25. The heating air enters the vehicle heater through the heating air intake pipe 26 and the combustion air enters through the combustion air intake pipe 27. The burner is mounted at one end of a tubular combustion chamber 1 provided with holes 1a, the diameters of which increase in a direction toward the end of the combustion chamber away from the burner. A heat exchange pipe 3, hereinafter referred to as heat exchanger 3 for brevity, is crimped over the combustion chamber. The heat exchanger is pot-shaped, i.e., it is closed off at one end by a bottom 3a. The bottom 3a of heat exchanger 3 is located at the end of combustion chamber 1 away from the burner, so that the combustion gases escaping from combustion chamber 1 flow, either through holes 1a or the end of the chamber, in the annular space 2 between heat exchanger 3 and the wall of combustion chamber 1 in an axially parallel manner, but opposite to the direction of the flame.

A double-walled pot 4 rests on top of the arrangement composed of combustion chamber 1 and heat exchanger 3, leaving an annular space, in such a fashion that the bottom of the pot 4, at the end of combustion chamber 1 where the burner is located, and the end of the pot 4 which is opposite the bottom, are in the vicinity of the end of the combustion chamber 1 away from the burner. The double-walled pot 4 has a central opening into which combustion chamber 1 fits. Annular space 2, between heat exchanger 3 and combustion chamber 1, is directly connected to the bottom of double-walled pot 4 and to the annular chamber which exists between the inside wall 4b and outside wall 4c of the double-walled pot.

An exhaust pipe 5 is provided in an area of double-walled pot 4 which is near its bottom. On top of this exhaust pipe is a baffle 11, described below in greater detail. Double-walled pot 4 is surrounded at a certain distance by housing wall 6 of the vehicle heater, so that there is an annular space 7 between housing wall 6 and outside wall 4c of double-walled pot 4, through which space the fresh air driven by blower 24 can flow. A deflecting pipe 9 is so disposed in the annular space between inside wall 4b and heat exchanger 3 that it is at approximately the same distance from inside wall 4b as it is from heat exchanger 3, whereby approximately the same distance is maintained between the end of deflecting pipe 9 and the transition element between inside wall 4b and heat exchanger 3. Deflecting pipe 9 merges with heating air outlet pipe 28. A small air gap 29 is provided between deflecting pipe 9 and heating air outlet pipe 28 at points (at the top in FIG. 1).

Figure 6:
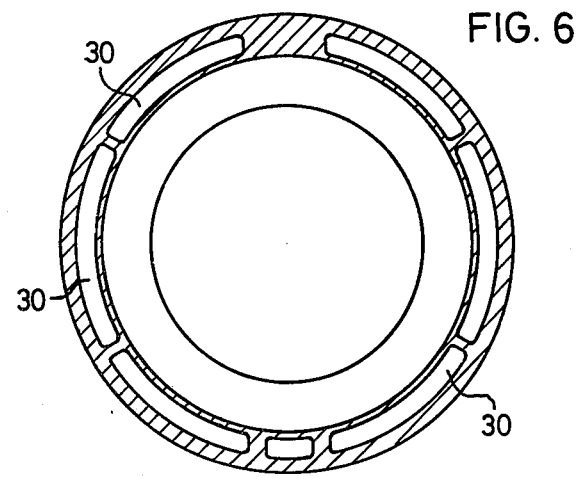
FIG. 6 is a cross section along line VI—VI in FIG. 1.

The vehicle heater operates as follows:

Fresh air is driven in through the heat exchanger of the vehicle heater by heating air blower 24 driven by motor 23, through heating air ducts 30, visible in the cross section in FIG. 6. From ducts 30, the fresh air flows between housing wall 6 and outside wall 4c of double-walled pot 4. At taper 8, the heating air is deflected radially inward and, therefore, strikes deflecting pipe 9 located in heating air outlet pipe 28 (see the arrows), so that the heating air flows back between deflecting pipe 9 and inside wall 4b of double-walled pot 4. Consequently, and also as a result of flowing through chamber 7, the heating air absorbs the heat of the combustion gases flowing in the double-walled pot 4. When it reaches the end of deflecting pipe 9, the heating air flows through the transition section between inside wall 4b and heat exchanger 3 and then, in the direction of the burner, along heat exchanger 3 to heating air outlet pipe 28, where it is further heated by the hot heat exchanger 3. A portion of the heating air, if required to reduce the flow losses, can flow directly out of chamber 7 through an air gap 29 into heating air outlet pipe 28.

The fuel which is burned in burner 20 after ignition by spark plug 22, with influx of combustion air through combustion air inlet pipe 27 and blower 25, produces a coaxial flame in combustion chamber 1. The combustion gases flow partially through holes 1a in the combustion chamber and partially into pot-shaped heat exchanger 3 through its end, i.e., into the annular chamber 2 formed between heat exchanger 3 and combustion chamber 1. Here the gases are cooled by the heating air which is flowing countercurrently past the outside wall of heat exchanger 3. After leaving annular chamber 2, the combustion gases flow into the bottom area 4a of double-walled pot 4. To prevent them from flowing directly from there into the exhaust pipe 5 located at that point, a baffle 11 is disposed above said pipe.

Figure 2:
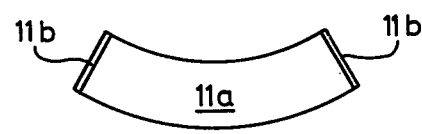
FIG. 2 is a detail of the vehicle heater according to FIG. 1 in a vertical section.
Figure 4:
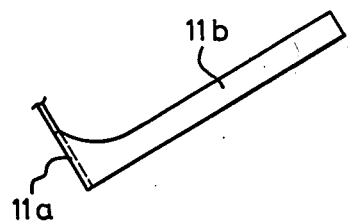
FIG. 4 shows the part shown in FIG. 2, in a side view.
Figure 3:
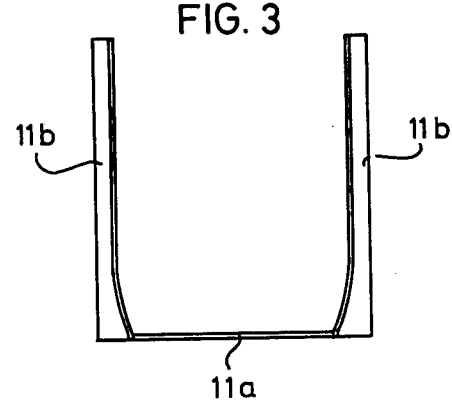
FIG. 3 shows the part shown in FIG. 2, in a top view.
Figure 5:
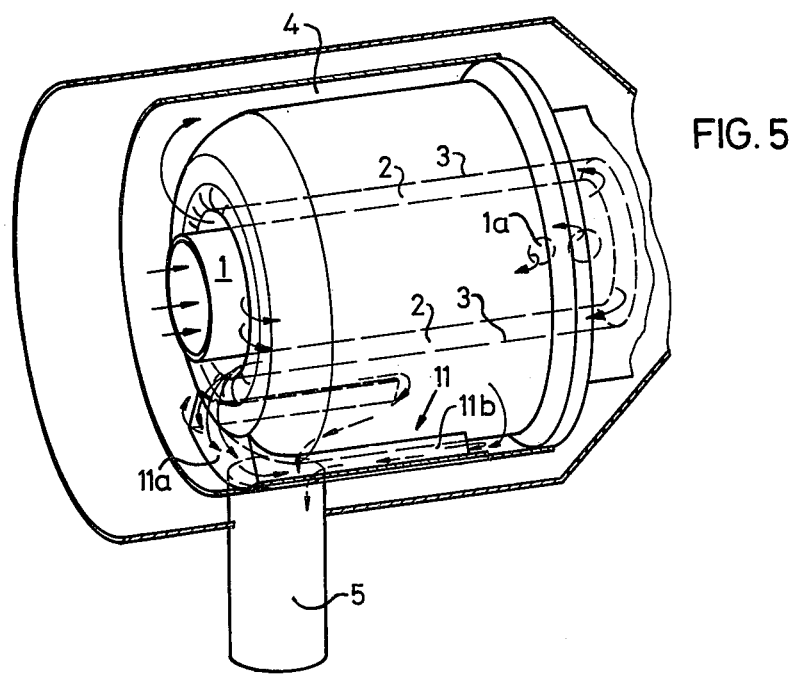
FIG. 5 is a perspective partial view of the vehicle heater shown in FIG. 1.

Baffle 11 is shown in FIGS. 2, 3 and 4 in three different views. It consists of a front part 11a made of circular segments and two lateral segments 11b directed radially, fastened to both sides of front part 11a. The mounting of baffle 11 in the heat exchanger unit is shown especially clearly in the perspective view in FIG. 5. The combustion gases coming from chamber 2 into double-walled pot 4 strike the front side 11a and lengthwise sides 11b of the baffle, whose height corresponds to the distance between outside wall 4c and inside wall 4b of double-walled pot 4. The combustion gases are, therefore, forced by baffle 11 to move within the double-walled pot 4 in the direction of the end which is opposite the burner. They then enter the inside chamber delimited by the baffle and exhaust pipe 5. This flow ensures that they will give off their heat, for the most part, to the heating air which is flowing over the double-walled pot.

As is evident from FIG. 1, welded seams are provided between heat exchanger 3 and its bottom 3a, between heat exchanger 3 and inside wall 4b, and/or the transition element of double-walled pot 4, and between inside wall 4b and outside wall 4c of double-walled pot 4. These welded seams are circular and can, therefore, be produced at low cost by automatic methods.

It is evident that double-walled pot 4 considerably increases the heat exchanging surfaces and consequently the efficiency of the vehicle heater. The separate paths provided for the combustion gas and heating air ensure that housing wall 6 of the vehicle heater is shielded to the maximum degree from radiant heat. The fact that fresh heating air flows along housing wall 6 also ensures that housing wall 6 of the vehicle heater always remains cool.

Figure 7:
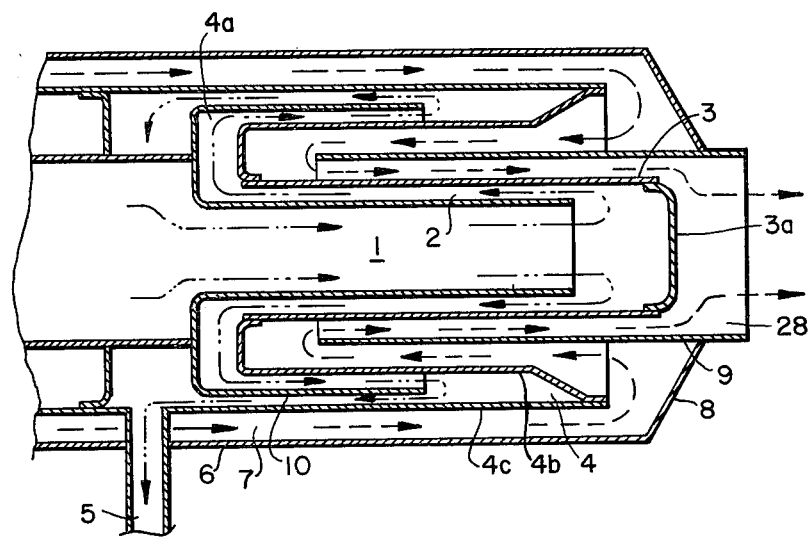
FIG. 7 is a second embodiment of the heat exchanger in partial lengthwise section.

FIG. 7 shows a heat exchanger unit according to a modified embodiment of the invention.

In the embodiment shown in FIG. 7, no baffle is provided in double-walled pot 4, but rather a combustion gas deflecting pipe 10 is provided, which divides the interior space between inside wall 4b and outside wall 4c into two parts, so that the combustion gases coming out of chamber 2, between heat exchanger 3 and combustion chamber 1, are initially forced by the combustion gas deflecting pipe to flow along inside wall 4b in the direction of its end located away from the burner and from there along outside wall 4c in the direction of the end of the heat exchanger unit where the burner is located. Only then can the combustion gases leave double-walled pot 4 through exhaust pipe 5. In this embodiment, the countercurrent principle is utilized to the maximum extent.

Figure 8:
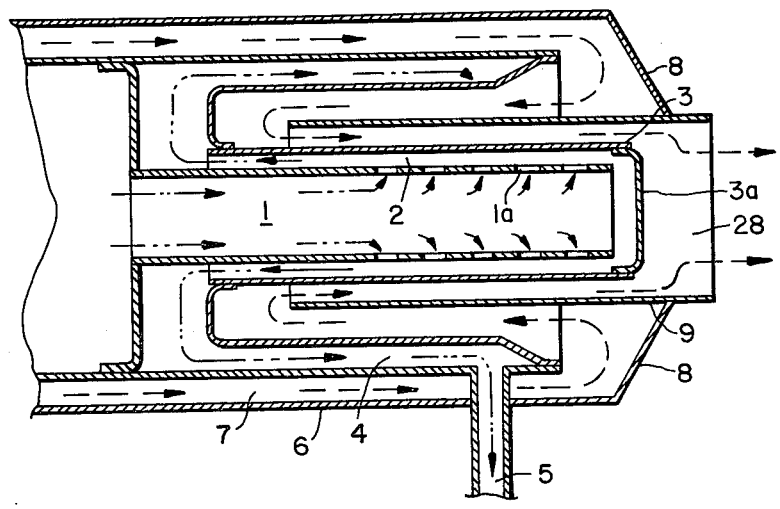
FIG. 8 is another embodiment of the heat exchanger in partial lengthwise section.

FIG. 8 shows another embodiment which differs from the embodiments described previously in that it comprises neither a baffle nor a combustion gas deflecting pipe. Instead, uniform flow through the chamber between outside wall 4c and inside wall 4b of double-walled pot 4 is ensured in this embodiment by virtue of the fact that exhaust pipe 5 is disposed in the vicinity of the part of the combustion chamber which is located away from the bottom of double-walled pot 4, i.e., is in the vicinity of the end away from the burner. In this, as in all embodiments, however, baffles can be added to the combustion gas chamber of pot 4 in order to achieve a flow through this chamber which is as uniform as possible.

Figure 9:
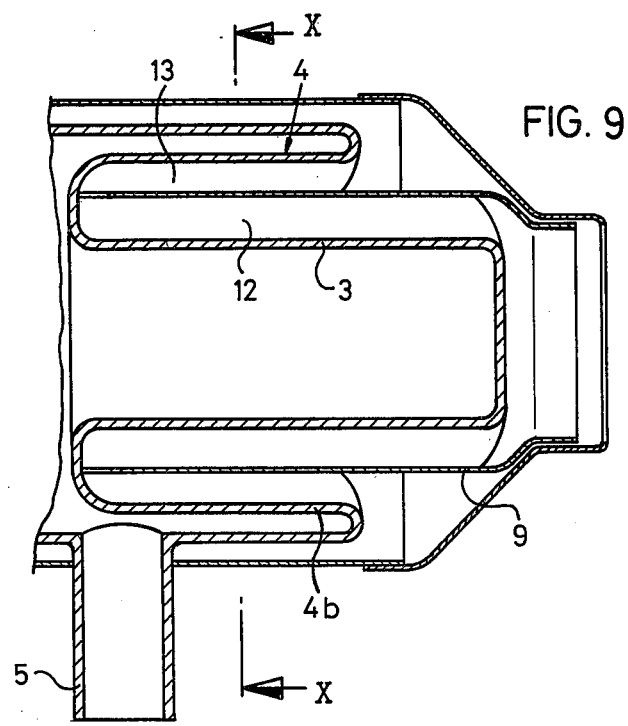
FIG. 9 is a heat exchanger which corresponds in principle to the heat exchanger of the vehicle heater shown in FIG. 1, but is made of castings.
Figure 10:
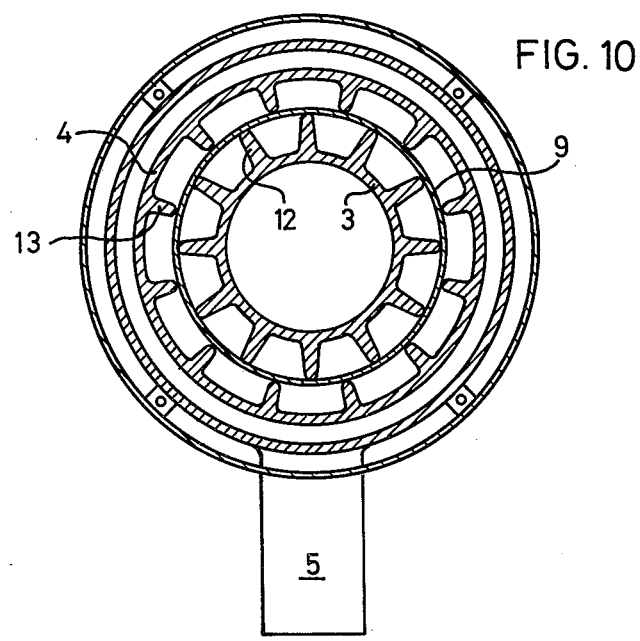
FIG. 10 is a section along line X—X in FIG. 9.

FIG. 9 shows an embodiment of the invention wherein the heat exchanger unit functions in a manner similar to the heat exchanger unit shown in FIG. 1. The only difference from FIG. 1 is that heat exchanger 3 and double-walled pot 4 are made of a casting, preferably an aluminum casting. Exhaust pipe 5 likewise is shaped integrally with this casting. Ribs 12 and 13 are provided for mounting deflecting pipe 9 therebetween (see FIG. 10), said pipe being made of stainless steel sheet. Ribs 12 extend lengthwise of and radially outward from heat exchanger 3. Similarly, ribs 13 extend lengthwise along the outside of inside wall 4b of the double-walled pot, and extend radially inward. However, ribs 13 are staggered circumferentially relative to lengthwise ribs 12. Deflecting pipe 9 is clamped between the edges of the free ends of the ribs which are directed at one another. This embodiment has shown itself to be especially advantageous from the standpoint of materials saving in large vehicle heaters, wherein material costs become more important.

It is understood that various walls of the heat exchanger and of the double-walled pot can be connected with one another even integrally, within the framework of the invention. For example, it is possible to combine, in the embodiment shown in FIG. 7, the inside wall 4b of pot 4 with heat exchanger 3, including bottom 3a, to form a one-piece crimped part.

While I have shown and described various embodiments in accordance with the present invention, it is understood that the same is not limited thereto, but susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Vehicle heater with a tubular combustion chamber and with a pot-shaped heat exchanger disposed over the combustion chamber in a manner leaving a first annular space therebetween, said heat exchanger being operable to deflect combustion gases in an axial direction, wherein a coaxial, double-walled pot is provided, said pot surrounding the heat exchanger with a second annular space being formed therebetween, said pot having an opening in a bottom area thereof which communicates, at said bottom area, with the first annular space between the combustion chamber and the heat exchanger in such fashion that the combustion gases are conducted into the space between an inside wall and an outside wall thereof, and from there out through an exhaust pipe, wherein the outside wall of the double-walled pot is surrounded coaxially by a housing wall of the heater and a medium to be heated is conductable into a third annular space located between the housing wall and the outside wall of the double-walled pot, and a deflecting pipe is disposed in the second annular space in such fashion that the medium to be heated flows out of the third annular space along the inside wall of the pot and from there along the heat exchanger before leaving the heater through the deflecting pipe.

2. Vehicle heater with a tubular combustion chamber and with a pot-shaped heat exchanger disposed over the combustion chamber in a manner leaving a first annular space therebetween, said heat exchanger being operable to deflect combustion gases in an axial direction, and a coaxial, double-walled pot being provided, said pot surrounding the heat exchanger with a second annular space being formed therebetween, said pot having an opening in a bottom area thereof which communicates, at said bottom area, with the first annular space between the combustion chamber and the heat exchanger in such fashion that the combustion gases are conducted into the space between an inside wall and an outside wall thereof, and from there out through an exhaust pipe, wherein means are provided for creating a flow path for a medium to be heated between an inlet and an outlet of the heater, said flow path having a first portion wherein the medium to be heated is caused to flow in a first direction along the outside wall of said double-walled pot, a second portion wherein the medium is caused to flow in an opposite direction along the inside wall of said pot, and a third portion wherein the medium is caused to flow in said first direction along the exterior of said heat exchanger.

3. Vehicle heater according to claim 1, wherein the housing wall has a taper in the vicinity of an end of the double-walled pot which is disposed away from the bottom area.

4. Vehicle heater according to claim 1 or 3, wherein an exhaust gas deflecting pipe is disposed in the double-walled pot between its inside wall and its outside wall, and the exhaust pipe is disposed in a bottom area of the pot.

5. Vehicle heater according to claim 1 or 3, wherein the exhaust pipe is disposed in a bottom area of the pot, and the pot comprises a baffle, through which a direct path to the exhaust pipe is blocked for combustion gases entering the interior chamber of the pot.

6. Vehicle heater according to claim 1 or 3, wherein the heat exchange and the double-walled pot are manufactured of welded sheets.

7. Vehicle heater according to claim 3, wherein the heat exchanger and the double-walled pot, including the exhaust pipe, are manufactured from a single casting, longitudinal ribs being formed on an outside surface of the inside wall of the double-walled pot, longitudinal ribs being formed on the outside surface of the heat exchanger in circumferentially staggered relationship to the lengthwise ribs of the pot, and the deflecting pipe is clamped between the staggered longitudinal ribs.

8. Vehicle heater according to claim 2, wherein a flow path for said combustion gases is formed in such a manner that the combustion gases travel in counterflow, heat exchange relationship with respect to the flow of the medium to be heated within at least two of said first, second and third portions of its flow path.

9. Vehicle heater according to claim 2, wherein a flow path for said combustion gases is formed in such a manner that the combustion gases travel in counterflow, heat exchange relationship with respect to the flow of the medium to be heated within all three of said first, second and third portions of its flow path.

* * * * *